(12) United States Patent
Wang et al.

(10) Patent No.: US 11,796,390 B2
(45) Date of Patent: Oct. 24, 2023

(54) BANDGAP MEASUREMENTS OF PATTERNED FILM STACKS USING SPECTROSCOPIC METROLOGY

(71) Applicant: KLA Corporation, Milpitas, CA (US)

(72) Inventors: Tianhan Wang, Milpitas, CA (US); Aaron Rosenberg, Milpitas, CA (US); Dawei Hu, Milpitas, CA (US); Alexander Kuznetsov, Milpitas, CA (US); Manh Dang Nguyen, Milpitas, CA (US); Stilian Pandev, Santa Clara, CA (US); John Lesoine, Milpitas, CA (US); Qiang Zhao, Milpitas, CA (US); Liequan Lee, Fremont, CA (US); Houssam Chouaib, San Jose, CA (US); Ming Di, Hayward, CA (US); Torsten R. Kaack, Los Altos, CA (US); Andrei V. Shchegrov, Campbell, CA (US); Zhengquan Tan, Milpitas, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/856,660

(22) Filed: Jul. 1, 2022

(65) Prior Publication Data
US 2022/0349752 A1 Nov. 3, 2022

Related U.S. Application Data

(62) Division of application No. 15/672,120, filed on Aug. 8, 2017, now Pat. No. 11,378,451.
(Continued)

(51) Int. Cl.
*G01J 3/18* (2006.01)
*G01J 3/28* (2006.01)
(Continued)

(52) U.S. Cl.
CPC . *G01J 3/18* (2013.01); *G01J 3/28* (2013.01); *G01N 21/21* (2013.01); *G01N 21/25* (2013.01);
(Continued)

(58) Field of Classification Search
None
See application file for complete search history.

(56) References Cited

U.S. PATENT DOCUMENTS

| 5,608,526 A | 3/1997 | Piwonka-Corle et al. |
| 5,859,424 A | 1/1999 | Norton et al. |
(Continued)

FOREIGN PATENT DOCUMENTS

| JP | 2004286468 A | 10/2004 |
| JP | 2016502755 A | 1/2016 |
(Continued)

OTHER PUBLICATIONS

Search Report and Written Opinion in International Application No. PCT/US2022/032927 dated Sep. 23, 2022, 8 pages.
(Continued)

*Primary Examiner* — David P Turocy
(74) *Attorney, Agent, or Firm* — Suiter Swantz pc llo

(57) ABSTRACT

A spectroscopic metrology system includes a spectroscopic metrology tool and a controller. The controller generates a model of a multilayer grating including two or more layers, the model including geometric parameters indicative of a geometry of a test layer of the multilayer grating and dispersion parameters indicative of a dispersion of the test layer. The controller further receives a spectroscopic signal of a fabricated multilayer grating corresponding to the modeled multilayer grating from the spectroscopic metrology tool. The controller further determines values of the one or more parameters of the modeled multilayer grating pro-
(Continued)

viding a simulated spectroscopic signal corresponding to the measured spectroscopic signal within a selected tolerance. The controller further predicts a bandgap of the test layer of the fabricated multilayer grating based on the determined values of the one or more parameters of the test layer of the fabricated structure.

14 Claims, 9 Drawing Sheets

Related U.S. Application Data

(60) Provisional application No. 62/542,260, filed on Aug. 7, 2017.

(51) Int. Cl.
*G01N 21/55* (2014.01)
*G01N 21/956* (2006.01)
*G01N 21/21* (2006.01)
*G01N 21/25* (2006.01)
*G01N 21/88* (2006.01)
*G01N 21/84* (2006.01)

(52) U.S. Cl.
CPC ......... *G01N 21/55* (2013.01); *G01N 21/8422* (2013.01); *G01N 21/8851* (2013.01); *G01N 21/956* (2013.01); *G01J 2003/2836* (2013.01); *G01N 2021/8883* (2013.01)

(56) References Cited

U.S. PATENT DOCUMENTS

| | | | |
|---|---|---|---|
| 6,429,943 | B1 | 8/2002 | Opsal et al. |
| 7,478,019 | B2 | 1/2009 | Zangooie et al. |
| 7,528,944 | B2 * | 5/2009 | Chen ................ G01N 21/47 356/237.1 |
| 7,933,026 | B2 | 4/2011 | Opsal et al. |
| 9,291,554 | B2 | 3/2016 | Kuznetsov et al. |
| 9,405,290 | B1 | 8/2016 | Malkova et al. |
| 9,412,673 | B2 | 8/2016 | Kim et al. |
| 9,470,639 | B1 | 10/2016 | Zhuang et al. |
| 9,595,481 | B1 | 3/2017 | Malkova et al. |
| 9,664,734 | B2 | 5/2017 | Malkova et al. |
| 9,739,702 | B2 | 8/2017 | Bringoltz et al. |
| 2001/0042832 | A1 * | 11/2001 | Herzinger ............ G01N 21/211 250/341.4 |
| 2006/0167651 | A1 | 7/2006 | Zangooie et al. |
| 2009/0135416 | A1 | 5/2009 | Shchegrov et al. |
| 2011/0059602 | A1 | 3/2011 | Jeon et al. |
| 2013/0083320 | A1 * | 4/2013 | Gao ................ G01N 21/9501 356/237.5 |
| 2013/0245985 | A1 | 9/2013 | Flock et al. |
| 2014/0172394 | A1 | 6/2014 | Kuznetsov et al. |
| 2014/0222380 | A1 | 8/2014 | Kuznetsov et al. |
| 2014/0297211 | A1 | 10/2014 | Pandev et al. |
| 2014/0316730 | A1 | 10/2014 | Shchegrov et al. |
| 2014/0375981 | A1 * | 12/2014 | Wang ................ G01N 21/9501 356/51 |
| 2015/0046118 | A1 | 2/2015 | Pandev et al. |
| 2015/0058813 | A1 | 2/2015 | Kim et al. |
| 2015/0060697 | A1 | 3/2015 | Umetsu et al. |
| 2016/0109375 | A1 | 4/2016 | Pandev et al. |
| 2016/0139032 | A1 | 5/2016 | Rampoldi et al. |
| 2016/0141193 | A1 | 5/2016 | Pandev et al. |
| 2016/0282105 | A1 | 9/2016 | Pandev |
| 2016/0290796 | A1 | 10/2016 | Levy et al. |
| 2016/0341792 | A1 | 11/2016 | Malkova et al. |
| 2019/0086200 | A1 | 3/2019 | Amit |
| 2019/0361358 | A1 | 11/2019 | Tel et al. |
| 2021/0080839 | A1 | 3/2021 | Drachuck et al. |

FOREIGN PATENT DOCUMENTS

| | | |
|---|---|---|
| JP | 2018536862 A | 12/2018 |
| TW | 201408988 A | 3/2014 |
| TW | 201610399 A | 3/2016 |
| TW | 201721308 A | 6/2017 |
| WO | 03104929 A2 | 12/2003 |

OTHER PUBLICATIONS

A. S. Ferlauto et al., "Analytical model for the optical functions of amorphous semiconductors from the near-infrared to ultraviolet: Application in thin film photovoltaics," J. Appl. Phys. 92, 2424 (2002).

International Search Report dated Dec. 7, 2018 for PCT/US2018/045302.

J. Price et al., "Identification of interfacial defects in high-k gate stack films by spectroscopic ellipsometry," J. Vac. Sci. Technol. B 27 (1), 310 (2009).

J. Price et al., "Identification of sub-band-gap absorption features at the HfO2/Si(100) interface via spectroscopic ellipsometry," APL 91, 061925 (2007).

N. V. Nguyen et al., "Optical properties of Jet-Vapor-Deposited TiAlO and HfAlO determined by Vacuum Ultraviolet Spectroscopic Ellipsometry," AIP Conf. Proc. 683, 181 (2003).

N. V. Nguyen, "Sub-bandgap defect states in polycrystalline hafnium oxide and their suppression by admixture of silicon", Applied Physics Letters, Nov. 2, 2005, vol. 87, 192903, American Institute of Physics.

Office Action in Taiwanese Application No. 107127004 dated May 23, 2022, 17 pages.

Office Action in Japanese Application No. 2020-506748 dated Sep. 9, 2022, 6 pages (with Translation).

* cited by examiner

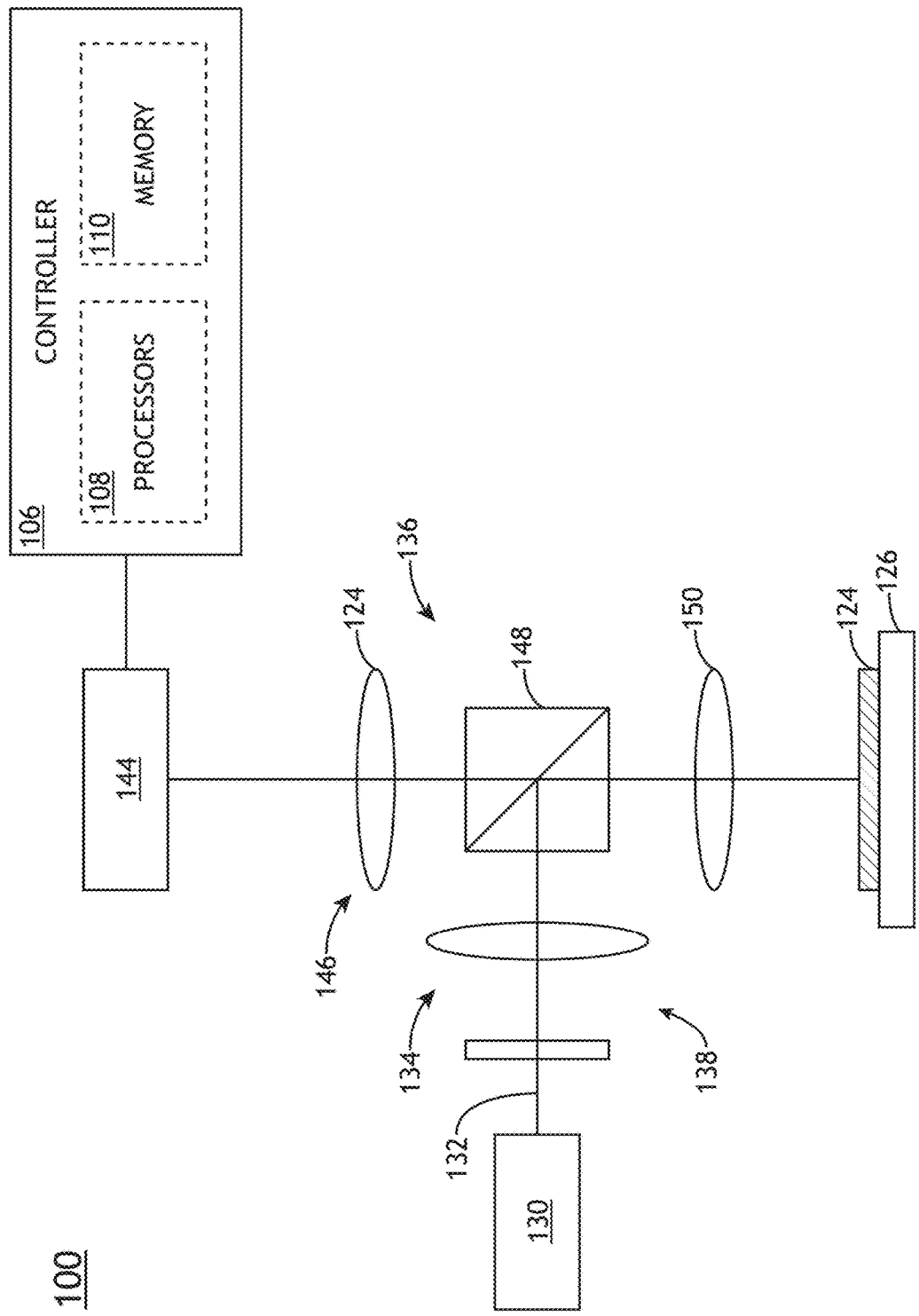

BANDGAP MEASUREMENTS OF PATTERNED FILM STACKS USING SPECTROSCOPIC METROLOGY

CROSS-REFERENCE TO RELATED APPLICATION

The present application constitutes a divisional application of U.S. patent application Ser. No. 15/672,120, filed Aug. 8, 2017, which claims the benefit under 35 U.S.C. § 119(e) of U.S. Provisional Application Ser. No. 62/542,260 filed Aug. 7, 2017, which are each incorporated herein by reference in their entirety.

TECHNICAL FIELD

The present disclosure relates generally to spectroscopic metrology and, more particular, to bandgap measurements of patterned film stacks using spectroscopic metrology.

BACKGROUND

Demand for electronic devices with ever-smaller footprints presents a wide range of manufacturing challenges beyond fabrication at a desired scale. For example, as the physical size of electronic components such as transistors shrinks, electrical and optical properties of the constituent film layers become increasingly dependent on physical geometry. In particular, leakage current through thin insulating layers presents a significant challenge for devices manufactured with lithography tools incorporating wavelengths lower than 65 nm. This leakage current negatively impacts device performance and may lead to increased operating temperatures as well as increased power consumption. It is therefore desirable to closely monitor and control the properties of insulating layers during fabrication to ensure that a fabricated device operates within design specifications.

Metrology targets are commonly used to monitor various aspects of fabricated layers of a semiconductor device. Metrology targets typically consist of a series of target features fabricated on the same layers as device features and are designed to be sensitive to one or more fabrication parameters of interest such as, but not limited to, a layer thickness, layer optical properties (e.g., dispersion, bandgap, and the like), a critical dimension, a sidewall angle, relative alignment of two or more layers (e.g., overlay), focal position of a target, or exposure dose during a lithography step. In this regard, measurements of a metrology target may provide sensitive data representative of fabricated device features.

In many applications, metrology targets are designed to facilitate a measurement of a desired fabrication parameter and may thus have a different physical configuration than a corresponding device feature. However, an increased dependence of electrical and optical properties of fabricated layers on the physical geometry may reduce a correlation between measurements of metrology targets and device features with different geometries. This may be particularly true for, but is not limited to, multilayer grating structures including periodic features formed from multiple thin film layers fabricated with increasingly small dimensions. Therefore, it would be desirable to provide a system and method to address deficiencies such as those identified above.

SUMMARY

A spectroscopic metrology system is disclosed in accordance with one or more illustrative embodiments of the present disclosure. In one illustrative embodiment, the system includes a spectroscopic metrology tool to provide a spectroscopic signal indicative of the radiation emanating from a multilayer grating including two or more layers in response to incident illumination. In another illustrative embodiment, the system includes a controller communicatively coupled to the spectroscopic metrology tool. In another illustrative embodiment, the controller generates a model of a multilayer grating including two or more layers, the model including one or more parameters associated with multilayer grating in which the one or more parameters include geometric parameters indicative of a geometry of a test layer of the multilayer grating and one or more dispersion parameters indicative of a dispersion of the test layer. In another illustrative embodiment, the controller receives a spectroscopic signal of a fabricated multilayer grating corresponding to the modeled multilayer grating from the spectroscopic metrology tool. In another illustrative embodiment, the controller determines values of the one or more parameters of the modeled multilayer grating providing a simulated spectroscopic signal corresponding to the measured spectroscopic signal within a selected tolerance. In another illustrative embodiment, the controller predicts a bandgap of the test layer of the fabricated multilayer grating based on the determined values of the one or more parameters of the test layer of the fabricated structure.

A bandgap quantification method is disclosed in accordance with one or more illustrative embodiments of the present disclosure. In one illustrative embodiment, the method includes generating a model of a metrology target, the metrology target including a multilayer grating formed from two or more layers, the model parameterized with one or more parameters associated with the multilayer grating in which the one or more parameters include geometric parameters associated with the multilayer grating and one or more dispersion parameters indicative of a dispersion of a test layer of the two or more layers. In another illustrative embodiment, the method includes measuring a spectroscopic signal of a fabricated multilayer grating corresponding to the modeled multilayer grating. In another illustrative embodiment, the method includes determining values of the one or more parameters of the modeled multilayer grating providing a simulated spectroscopic signal corresponding to the measured spectroscopic signal within a selected tolerance. In another illustrative embodiment, the method includes calculating a metrology metric for the metrology target indicative of a bandgap of the test layer of the fabricated multilayer grating based on the determined values of the one or more parameters.

A fabrication system is disclosed, in accordance with one or more illustrative embodiments of the present disclosure. In one illustrative embodiment, the system includes one or more process tools for fabricating multilayer gratings including two or more layers based on a process recipe. In another illustrative embodiment, the system includes a spectroscopic metrology tool to provide a spectroscopic signal indicative of the radiation emanating from a multilayer grating in response to incident illumination, the multilayer grating fabricated by the one or more process tools. In another illustrative embodiment, the system includes a controller communicatively coupled to the spectroscopic metrology tool and the one or more process tools. In another illustrative embodiment, the controller generates a model of a multilayer grating including two or more layers, the model including one or more parameters associated with multilayer grating in which the one or more parameters include geometric parameters indicative of a geometry of a test layer of the multilayer grating and one or more parameters include dispersion parameters indicative of a dispersion of the test layer. In another illustrative embodiment, the controller receives a spectroscopic signal of a fabricated multilayer grating corresponding to the modeled multilayer grating from the spectroscopic metrology tool, the fabricated multilayer grating fabricated by the one or more process tools based on a selected process recipe. In another illustrative embodiment, the controller determines values of the one or more parameters of the modeled multilayer grating providing a simulated spectroscopic signal corresponding to the measured spectroscopic signal within a selected tolerance. In another illustrative embodiment, the controller calculates a bandgap of the test layer of the fabricated multilayer grating based on the determined values of the one or more parameters of the test layer of the fabricated structure. In another illustrative embodiment, the controller adjusts the process recipe for the one or more process tools for fabricating multilayer gratings based on the predicted bandgap of the test layer.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 1D is a conceptual view illustrating the metrology tool configured with a single illumination and collection optical element, in accordance with one or more embodiments of the present disclosure.

DETAILED DESCRIPTION

Figure 1A:
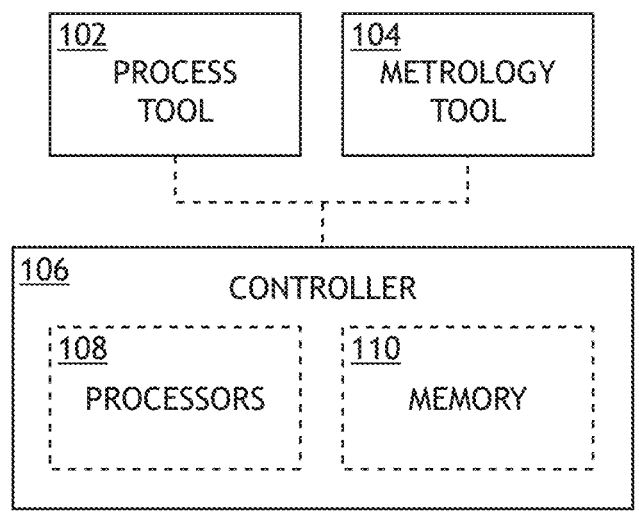
FIG. 1A is a conceptual view illustrating a semiconductor device fabrication system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to providing metrology metrics of device-like metrology targets. For example, a device-like metrology target may include, but is not required to include, a multilayer grating including periodically-distributed features formed from multiple material layers of a sample. Such metrology targets may physically approximate and may thus be representative of transistor structures such as, but not limited to, 3D field-effect transistor (FinFET) structures or memory structures. Additional embodiments of the present disclosure are directed to providing a metrology metric proportional to an optical bandgap of one or more test layers (e.g., an insulating material layer of a multilayer grating, and the like). For example, the bandgap of an insulating material may be indicative of electrical properties of the material and may further be indicative of the leakage current of the insulating material when used in a transistor. In this regard, a metrology metric proportional to the bandgap of a test layer may provide data indicative of eventual device performance of similarly-fabricated transistors. In some embodiments, a test layer of a metrology target may be formed from, but is not required to be formed from, an insulating material with a relatively high relative permittivity (e.g., a "high-k" material) such as, but not limited to, hafnium dioxide, hafnium silicate, nitride hafnium silicate, or zirconium silicate.

As used throughout the present disclosure, the term "sample" generally refers to a substrate formed of a semiconductor or non-semiconductor material including one or more "layers" or "films," and patterned structures which are usually chosen to be periodic for optical metrology. For example, semiconductor or non-semiconductor materials include, but are not limited to, monocrystalline silicon, gallium arsenide, and indium phosphide. Layers formed on the substrate may include, but are not limited to, a resist, a dielectric material, a conductive material, or a semiconductive material. Many different types of sample layers are known in the art, and the term sample as used herein is intended to encompass a substrate and any types of layers formed thereon. Further, for the purposes of the present disclosure, the term sample and wafer should be interpreted as interchangeable. In addition, for the purposes of the present disclosure, the terms patterning device, mask and reticle should be interpreted as interchangeable.

Additional embodiments of the present disclosure are directed to modeling both the geometric and optical properties of metrology targets including multilayer grating structures. A parameterized model of a multilayer grating structure may include at least one geometric parameter and at least one dispersion parameter that may vary based on variations in fabrication processes and may further impact the bandgap of a test layer (e.g., a "high-k" insulating layer). In this regard, the parameterized model may take into account not only modifications of geometric or optical properties in isolation, but may also account for the dimension-dependent impact of the physical geometry on the bandgap of the test structure.

Further embodiments are directed to metrology targets having geometric parameters (e.g., film thicknesses, feature heights, feature widths, sidewall angles, and the like) substantially similar to the geometric parameters of device features (e.g., transistors, memory structures, and the like) that the metrology target is intended to represent. Accordingly, process-induced variations of geometric and/or dispersive parameters may impact the metrology target and the device features in substantially the same manner such that the metrology metric proportional to the bandgap extracted from the metrology target may provide an accurate indicator of the electrical and optical properties of the device feature.

Additional embodiments of the present disclosure are directed to determining a statistical relationship between spectroscopic signals of the metrology target and the bandgap of the test layer. In this regard, an analytic model taking into account complex relationships between the optical properties of the test layer and the geometry of the metrology target may not need to be developed. Rather, statistical relationships may be determined between particular aspects of spectroscopic signals and the modeled dispersion parameters such that a bandgap of a test layer of a fabricated metrology structure may be predicted based on a measured spectroscopic signal. It is recognized herein that such an approach may provide highly accurate predictions of the bandgap of a test layer for a wide range of complicated structures and may be particularly beneficial when an analytic model may be undesirable or unattainable (e.g., undesirably difficult to construct, too computationally burdensome, difficulties in accounting for defect states in film layers, and the like). However, it is further recognized herein that certain device features having multiple integrated feature geometries may require multiple modeled metrology targets corresponding to the different feature geometries to provide relevant correlations between measured bandgap and expected device performance.

For example, a statistical relationship between spectroscopic signals of the metrology target and values of the modeled dispersion parameters of the test layer may be determined through simulations of spectroscopic signals of many modeled metrology targets including multilayer gratings with varying parameters (e.g., varying geometric and dispersion parameters), calculating the modeled dispersion parameters for each simulation, and using a statistical model to determine statistical relationships between particular features of the spectroscopic signals measurable with the spectroscopic metrology tool and the modeled dispersion parameters of the test layer.

By way of another example, a statistical relationship between spectroscopic signals of the metrology target and values of the modeled dispersion parameters of the test layer may be determined by fabricating many metrology targets including multilayer gratings with varying parameters (e.g., varying geometric and dispersion parameters), measuring the modeled dispersion parameters for each fabricated target, and similarly using a statistical model to determine statistical relationships between particular features of the spectroscopic signals measurable with the spectroscopic metrology tool and the modeled dispersion parameters of the test layer.

By way of a further example, a statistical relationship between spectroscopic signals of the metrology target and values of the modeled dispersion parameters of the test layer may be determined by providing a full parameterized model of the dispersion of the test layer as well as the geometry of the multilayer grating and determining relevant model parameters using a regression analysis.

Additional embodiments of the present disclosure are directed to determining a metrology metric proportional to the bandgap of the test layer based on the values of the dispersion parameters determined using the statistical model. In cases where the statistical model provides values of dispersion parameters related to the bandgap, the bandgap or a metric proportional to the bandgap must be extracted from the values of the dispersion parameters. In some embodiments, a metrology metric proportional to the bandgap includes an integral of the dispersion curve in an exponentially-varying spectral region associated with an absorption edge (e.g., a transitional optical absorption). In this regard, the transitional optical absorption may provide a measure of the bandgap that is robust to defects that may not impact the electrical properties of interest (e.g., leakage current). In some embodiments, a dispersion curve including an Urbach tail is reconstructed using an exponential form for the Urbach tail region to facilitate the determination of the transitional optical absorption integral.

Additional embodiments of the present disclosure are directed to a spectroscopic metrology tool suitable for providing a metrology metric proportional to the bandgap of the test layer of a multilayer grating metrology target. A spectroscopic metrology tool suitable for providing spectroscopic signals suitable for statistical correlation to the bandgap of the test layer may include, but is not limited to, a spectrometer, a reflectometer, an ellipsometer, and the like. Accordingly, a spectroscopic signal may include, but is not limited to, the spectral power, polarization, and phase shift of light incident on the metrology target.

Additional embodiments of the present disclosure are directed to estimating the performance of a fabricated device based on the metrology metric. For example, the metrology metric proportional to the bandgap may be utilized to predict a leakage current associated with a fabricated device (e.g., a transistor, a memory device, or the like).

Further embodiments of the present disclosure are directed to controlling one or more process tools associated with fabricating device features based on the metrology metric proportional to the bandgap. For example, the metrology metric may provide diagnostic information suitable as a control parameter for a process tool. In this regard, variations of the metrology metric on one or more metrology targets of a wafer may be used to modify one or more aspects of subsequent layers on the same wafer (e.g., to compensate for the variations of the test layer) or may be used to modify the deposition of one or more aspects of a fabricated device on a subsequent production run. In one instance, variations of the metrology metric may be used to vary one or more parameters of a process recipe used to control one or more process tools.

FIG. 1A is a conceptual view illustrating a semiconductor device fabrication system 100, in accordance with one or more embodiments of the present disclosure. In one embodiment, the system 100 includes including a process tool 102 for fabricating one or more patterned layers (e.g., metrology target patterns, device features and the like) on sample. In another embodiment, the system 100 includes a metrology tool 104 configured to characterize one or more fabricated metrology targets on the sample. In another embodiment, the system 100 includes a controller 106. In another embodiment, the controller 106 includes one or more processors 108 configured to execute program instructions maintained on a memory medium 110. In this regard, the one or more processors 108 of controller 106 may execute any of the various process steps described throughout the present disclosure.

The process tool 102 may include any type of fabrication tool known in the art suitable for the manufacture of one or more patterned layers of an electronic device. Printed features on a sample associated with a sample layer may be fabricated through a series of additive or subtractive process steps such as, but not limited to, one or more material deposition steps, one or more lithography steps, one or more etching steps, or one or more lift-off steps. Accordingly, the process tool 102 may include, but is not limited to, a material deposition system, a lithography system, an etching system, or a lift-off system.

The metrology tool 104 may provide various types of measurements related to semiconductor manufacturing. For example, the metrology tool 104 may provide one or more metrology metrics of one or more metrology targets such as, but not limited to, a metrology metric proportional to bandgap, critical dimensions (e.g., widths of fabricated features at a selected height), overlay of two or more layers, sidewall angles, film thicknesses, or process-related parameters (e.g., focal position of a sample during a lithography step, an exposure dose of illumination during a lithography step, and the like).

It is recognized herein that semiconductor processes (e.g., deposition of a film, a lithography step, an etch step, and the like) performed by a semiconductor process tool may drift over time. Drift may be a result of a multitude of factors including, but not limited to, tool wear or drift in a control algorithm associated with the process. Further, the drift may affect one or more characteristics of a sample, which may, in turn, affect one or more metrology measurements (e.g., the metrology metric proportional to the bandgap, a critical dimension measurement, and the like). In this regard, metrology measurements may provide diagnostic information associated with one or more steps in a fabrication process.

The metrology tool 104 may include any type of metrology system known in the art suitable for providing metrology signals associated with metrology targets on a sample. In one embodiment, the metrology tool 104 is configured to provide spectroscopic signals indicative of one or more optical properties of a metrology target (e.g., one or more dispersion parameters, and the like) at one or more wavelengths. For example, the metrology tool 104 may include, but is not limited to, a spectrometer, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer. In one embodiment, the metrology tool 104 includes an image-based metrology tool to measure metrology data based on the generation of one or more images of a sample. In another embodiment, the metrology tool 104 includes a scatterometry-based metrology system to measure metrology data based on the scattering (reflection, diffraction, diffuse scattering, and the like) of light from the sample.

Further, the metrology system may include a single metrology tool or multiple metrology tools. A metrology system incorporating multiple metrology tools is generally described in U.S. Pat. No. 7,933,026 titled "High resolution monitoring of CD variations" issued on Apr. 26, 2011, and U.S. Pat. No. 7,478,019 titled "Multiple tool and structure analysis" issued on Jan. 13, 2009, both of which are incorporated herein by reference in their entirety. Focused beam ellipsometry based on primarily reflective optics is generally described in U.S. Pat. No. 5,608,526 titled "Focused beam spectroscopic ellipsometry method and system" issued on Mar. 4, 1997, which is incorporated herein by reference in its entirety. The use of apodizers to mitigate the effects of optical diffraction causing the spread of the illumination spot beyond the size defined by geometric optics is generally described in U.S. Pat. No. 5,859,424 titled "Apodizing filter system useful for reducing spot size in optical measurements and other applications" issued on Jan. 12, 1999, which is incorporated herein by reference in its entirety. The use of high-numerical-aperture tools with simultaneous multiple angle-of-incidence illumination is generally described by U.S. Pat. No. 6,429,943 titled "Critical dimension analysis with simultaneous multiple angle of incidence measurements" issued on Aug. 6, 2002, which is incorporated herein by reference in its entirety.

The metrology targets interrogated by the metrology tool 104 may include multiple layers (e.g., films) whose thicknesses can be measured by the metrology tool 104. Further, the metrology tool 104 may, but is not required to, measure the composition of one or more layers of a multilayer stack (e.g., a planar multilayer stack, a multilayer grating, and the like) or one or more defects on or within a sample. The use of a metrology tool to characterize non-periodic targets is generally described in U.S. Pat. No. 9,291,554 titled "Method of electromagnetic modeling of finite structures and finite illumination for metrology and inspection" issued on Mar. 22, 2016, which is incorporated herein by reference in its entirety.

Further, targets may be located at multiple sites on the semiconductor wafer. For example, targets may be located within scribe lines (e.g., between dies) and/or located in the die itself. Multiple targets may be measured simultaneously or serially by the same or multiple metrology tools as described in U.S. Pat. No. 7,478,019 titled "Multiple tool and structure analysis" issued on Jan. 13, 2009, which is incorporated herein by reference in its entirety. Metrology data from the metrology tool may be utilized in the semiconductor manufacturing process for example to feed-forward, feed-backward and/or feed-sideways corrections to the process (e.g., a lithography step, an etch step, and the like) to provide a complete process-control solution.

Figure 1B:
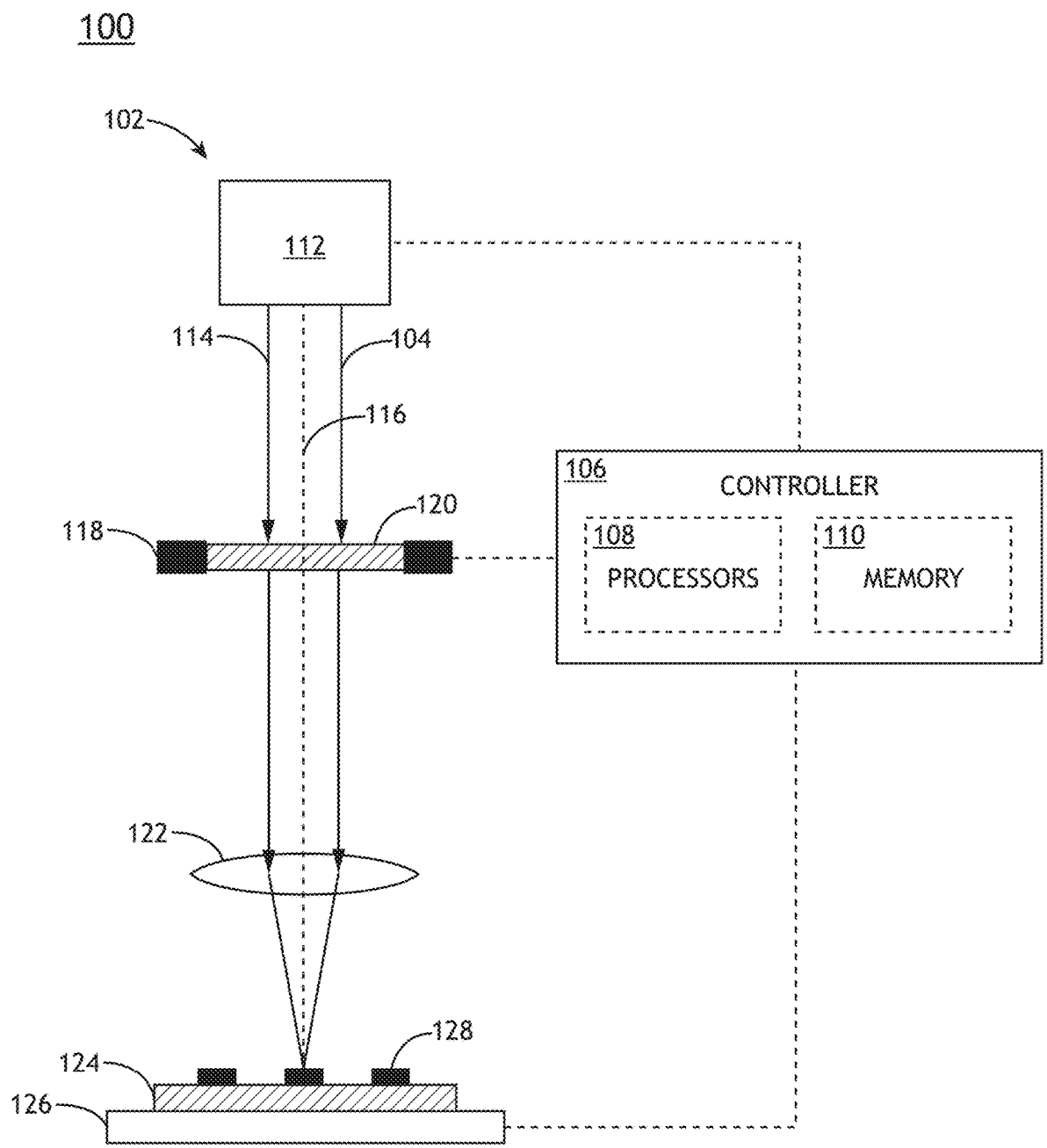
FIG. 1B is a conceptual view illustrating the process tool configured as a lithography tool, in accordance with one or more embodiments of the present disclosure.

FIG. 1B is a conceptual view illustrating the process tool 102 configured as a lithography tool, in accordance with one or more embodiments of the present disclosure. For example, a process tool 102 configured as a lithography tool may fabricate device structures including transistors and corresponding metrology targets including multilayer gratings as described previously herein. In one embodiment, the process tool 102 includes a lithography illumination source 112 configured to generate one or more illumination beams 114. The one or more illumination beams 114 may include one or more selected wavelengths of light including, but not limited to, ultraviolet (UV) radiation, visible radiation, or infrared (IR) radiation.

Illumination from the lithography illumination source 112 may have any spatial distribution (e.g., illumination pattern). For example, the lithography illumination source 112 may include, but is not limited to, a single-pole illumination source, a dipole illumination source, a C-Quad illumination source, a Quasar illumination source, or a free-form illumination source. In this regard, the lithography illumination source 112 may generate on-axis illumination beams 114 in which illumination propagates along (or parallel to) an optical axis 116 and/or any number of off-axis illumination beams 114 in which illumination propagates at an angle to the optical axis 116.

Further, the lithography illumination source 112 may generate the illumination beams 114 by any method known in the art. For an example, an illumination beam 114 may be formed as illumination from an illumination pole of the lithography illumination source 112 (e.g., a portion of an illumination profile of a lithography illumination source 112, and the like). By way of another example, lithography illumination source 112 may include multiple illumination sources for the generation of illumination beams 114.

In another embodiment, the process tool 102 includes a mask support device 118. The mask support device 118 is configured to secure a pattern mask 120. In another embodiment, the process tool 102 includes a set of projection optics 122 configured to project an image of the pattern mask 120 illuminated by the one or more illumination beams 114 onto a sample 124 disposed on a sample stage 126 in order to generate printed pattern elements corresponding to the image of the pattern mask 120. In another embodiment, the mask support device 118 may be configured to actuate or position the pattern mask 120. For example, the mask support device 118 may actuate the pattern mask 120 to a selected position with respect to the projection optics 122 of the system 100.

The sample 124 may include any number of photosensitive materials and/or material layers suitable for receiving the image of the pattern mask 120. For example, the sample 124 may include a resist layer 128. In this regard, the set of projection optics 122 may project an image of the pattern mask 120 onto on the resist layer 128 to expose the resist layer 128 and a subsequent etching step may remove the exposed material (e.g., positive etching) or the unexposed material (e.g., negative etching) in order to provide printed features on the sample 124. Further, the pattern mask 120 may be utilized in any imaging configuration known in the art. For example, the pattern mask 120 may be a positive mask (e.g., a bright-field mask) in which pattern elements are positively imaged as printed pattern elements. By way of another example, the pattern mask 120 may be a negative mask (e.g., a dark-field mask) in which pattern elements of the pattern mask 120 form negative printed pattern elements (e.g., gaps, spaces, and the like).

The controller 106 may be communicatively coupled to the mask support device 118 and/or the sample stage 126 to direct the transfer of pattern elements on a pattern mask 120 to a sample 124 (e.g., a resist layer 128 on the sample, and the like). For example, a process tool 102 may be configured to perform a fabrication step based on a process recipe including selected parameters used to control various aspects of the fabrication process. In one instance, considering a lithography tool as an example, a process recipe may include a configuration of the illumination beam 114, an exposure time, a position of the sample 124, or the like. Accordingly, a controller 106 may direct and/or modify one or more aspects of a fabrication process by modifying one or more parameters of the process recipe.

Figure 1C:
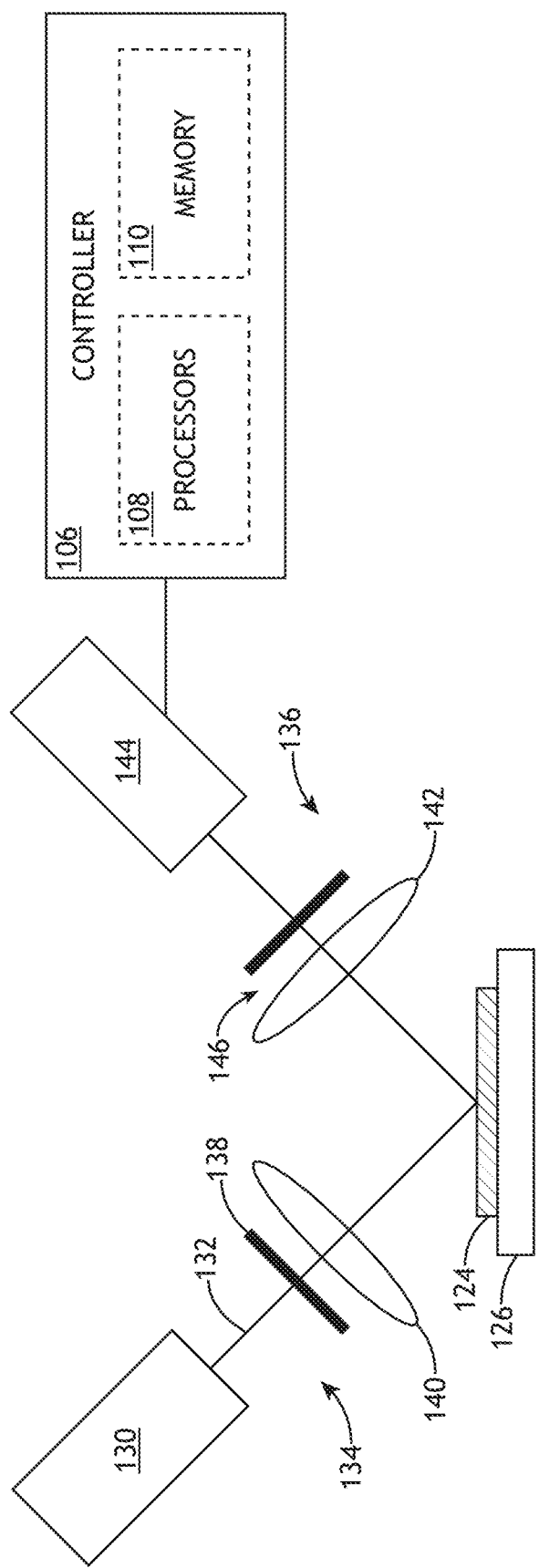
FIG. 1C is a conceptual view illustrating the metrology tool, in accordance with one or more embodiments of the present disclosure.

FIG. 1C is a conceptual view illustrating the metrology tool 104, in accordance with one or more embodiments of the present disclosure. In one embodiment, the metrology tool 104 includes a metrology illumination source 130 to generate a metrology illumination beam 132. In another embodiment, the metrology illumination source 130 is the same as the lithography illumination source 112. In a further embodiment, the metrology illumination source 130 is a separate illumination source configured to generate a separate metrology illumination beam 132. The metrology illumination beam 132 may include one or more selected wavelengths of light including, but not limited to, ultraviolet (UV) radiation, visible radiation, or infrared (IR) radiation.

For example, the metrology illumination source 130 may include, but is not limited to, one or more narrowband laser sources, one or more a broadband laser sources, one or more supercontinuum laser sources, one or more white light laser sources, and the like. In this regard, the metrology illumination source 130 may provide a metrology illumination beam 132 having high coherence (e.g., high spatial coherence and/or temporal coherence). In another embodiment, the metrology illumination source 130 includes a laser-driven light source (LDLS) such as, but not limited to, a laser-sustained plasma (LSP) source. For example, the metrology illumination source 130 may include, but is not limited to, a LSP lamp, a LSP bulb, or a LSP chamber suitable for containing one or more elements that, when excited by a laser source into a plasma state, may emit broadband illumination. In another embodiment, the metrology illumination source 130 includes a lamp source. By way of another example, the metrology illumination source 130 may include, but is not limited to, an arc lamp, a discharge lamp, an electrode-less lamp, and the like. In this regard, the metrology illumination source 130 may provide a metrology illumination beam 132 having low coherence (e.g., low spatial coherence and/or temporal coherence).

In another embodiment, the metrology illumination source 130 is configured to provide illumination having wavelengths surrounding an expected bandgap of a test layer such as, but not limited to "high-k" insulating layers having bandgaps in the UV spectral region or layers of a memory structure having bandgaps in the IR spectral region) of a multilayer grating structure. For example, the metrology illumination source 130 may include, but is not required to include, a LDLS providing wavelengths in a spectral range between approximately 120 nanometers and 3 microns. By way of another example, the metrology illumination source 130 may provide wavelengths greater than approximately 150 nanometers suitable for determining the bandgap of insulating layers. By way of a further example, By way of another example, the metrology illumination source 130 may provide wavelengths greater than approximately 700 nanometers suitable for determining the bandgap of layers of a memory structure.

In another embodiment, the metrology illumination source 130 provides a tunable metrology illumination beam 132. For example, the metrology illumination source 130 may include a tunable source of illumination (e.g., one or more tunable lasers, and the like). By way of another example, the metrology illumination source 130 may include a broadband illumination source coupled to a tunable filter.

The metrology illumination source 130 may further provide a metrology illumination beam 132 having any temporal profile. For example, the metrology illumination beam 132 may have a continuous temporal profile, a modulated temporal profile, a pulsed temporal profile, and the like.

In another embodiment, the metrology illumination source 130 directs the metrology illumination beam 132 to the sample 124 via an illumination pathway 134 and collects radiation emanating from the sample via a collection pathway 136. The illumination pathway 134 may include one or more beam conditioning components 138 suitable for modifying and/or conditioning the metrology illumination beam 132. For example, the one or more beam conditioning components 138 may include, but are not limited to, one or more polarizers, one or more filters, one or more beam splitters, one or more diffusers, one or more homogenizers, one or more apodizers, or one or more beam shapers, or one or more lenses.

In another embodiment, the illumination pathway 134 may utilize a first focusing element 140 to focus the metrology illumination beam 132 onto the sample 124. In another embodiment, the collection pathway 136 may include a second focusing element 142 to collect radiation from the sample 124.

In another embodiment, the metrology tool 104 includes a detector 144 configured to capture radiation emanating from the sample 124 through the collection pathway 136. For example, a detector 144 may receive radiation reflected or scattered (e.g., via specular reflection, diffuse reflection, and the like) from the sample 124. By way of another example, a detector 144 may receive radiation generated by the sample 124 (e.g., luminescence associated with absorption of the metrology illumination beam 132, and the like). By way of another example, a detector 144 may receive one or more diffracted orders of radiation from the sample 124 (e.g., 0-order diffraction, ±1 order diffraction, ±2 order diffraction, and the like).

The detector 144 may include any type of optical detector known in the art suitable for measuring illumination received from the sample 124. For example, a detector 144 may include, but is not limited to, a CCD detector, a CMOS detector, a TDI detector, a photomultiplier tube (PMT), an avalanche photodiode (APD), and the like. In another embodiment, a detector 144 may include a spectroscopic detector suitable for identifying wavelengths of radiation emanating from the sample 124.

The collection pathway 136 may further include any number of collection beam conditioning elements 146 to direct and/or modify illumination collected by the second focusing element 142 including, but not limited to one or more lenses, one or more filters, one or more polarizers, or one or more phase plates. In this regard, the metrology tool 104 may be configured as any type of metrology tool such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

Further, it is noted herein that the metrology tool 104 depicted in FIG. 1C may facilitate multi-angle illumination of the sample 124, and/or more than one metrology illumination source 130 (e.g., coupled to one or more additional detectors 144). In this regard, the metrology tool 104 depicted in FIG. 1D may perform multiple metrology measurements. In another embodiment, one or more optical components may be mounted to a rotatable arm (not shown) pivoting around the sample 124 such that the angle of incidence of the metrology illumination beam 132 on the sample 124 may be controlled by the position of the rotatable arm. In another embodiment, the metrology tool 104 may include multiple detectors 144 (e.g., associated with multiple beam paths generated by one or more beamsplitters) to facilitate multiple metrology measurements (e.g., multiple metrology tools) by the metrology tool 104.

FIG. 1D is a conceptual view illustrating a metrology tool 104 configured with a single illumination and collection optical element, in accordance with one or more embodiments of the present disclosure. In one embodiment, the metrology tool 104 includes a beamsplitter 148 oriented such that an objective lens 150 may simultaneously direct the metrology illumination beam 132 to the sample 124 and collect radiation emanating from the sample 124. In this regard, the metrology tool 104 may be configured in an epi-illumination mode.

In another embodiment, though not shown, the metrology tool 104 includes a chamber suitable for regulating the composition and/or the pressure of the atmosphere surrounding the sample 124. For example, the metrology tool 104 may include one or more gas tanks, one or more valves, one or more hoses, one or more pumps, one or more pressure regulators, and the like to control the composition and/or pressure of the atmosphere of the surrounding the sample 124. In another embodiment, the metrology tool 104 is configured to provide an inert gas or a gas substantially transparent to wavelengths provided by the metrology illumination source 130 as an atmosphere surrounding the sample 124. For example, in the case of a metrology illumination source 130 configured to provide illumination surrounding an expected bandgap of a "high-k" insulating layer, the metrology tool 104 may be configured to provide a gas transparent to the corresponding wavelengths such as, but not limited to, argon or nitrogen. In one instance, the atmosphere surrounding the sample is configured to be transparent in the range of 120 nanometers to 2500 nanometers (e.g. corresponding to an output spectrum of a LDLS illumination source, or the like). In another instance, the atmosphere surrounding the sample is configured to be transparent in the range of 120 nanometers to 300 nanometers. In another instance, the atmosphere surrounding the sample is configured to be transparent in the range of 150 nanometers to 193 nanometers.

In another embodiment, the metrology tool 104 is communicatively coupled to the controller 106 of system 100. In this regard, the controller 106 may be configured to receive data including, but not limited to, metrology data (e.g., spectroscopic signals, images of the target, pupil images, and the like) or metrology metrics (e.g., a metrology metric proportional to a bandgap of a multilayer grating, critical dimensions, overlay precision, tool-induced shift, sensitivity, diffraction efficiency, through-focus slope, side wall angle, and the like).

Figure 2:
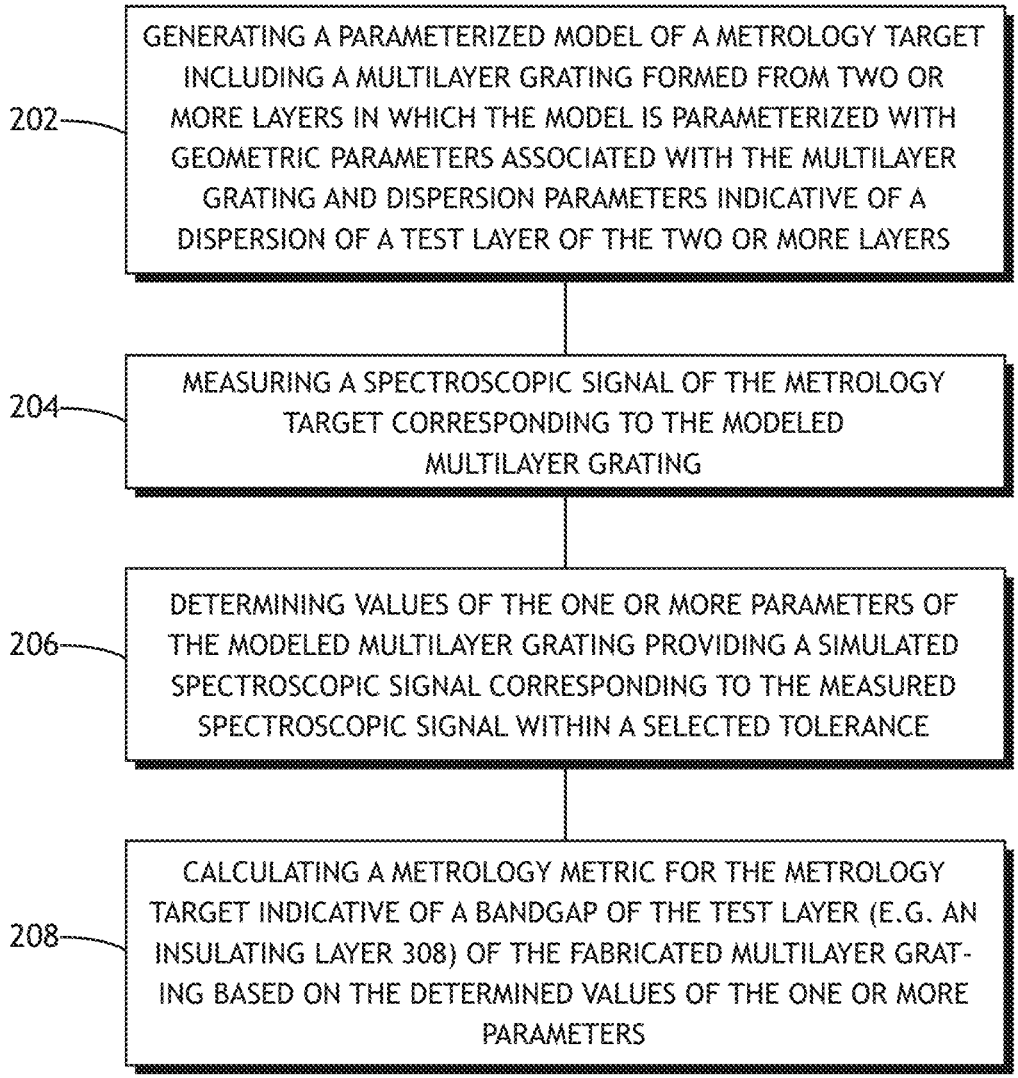
FIG. 2 is a flow diagram illustrating steps performed in a method for determining the bandgap of a metrology target, in accordance with one or more embodiments of the present disclosure.

FIG. 2 is a flow diagram illustrating steps performed in a method 200 for determining the bandgap of a metrology target, in accordance with one or more embodiments of the present disclosure. Applicant notes that the embodiments and enabling technologies described previously herein in the context of system 100 should be interpreted to extend to method 200. It is further noted, however, that the method 200 is not limited to the architecture of system 100.

Each of the steps of the method 200 may be performed as described further herein. The steps may be performed by one or more controllers (e.g., controller 106, and the like), which may be configured according to any of the embodiments described herein. In addition, the method described above may be performed by any of the system embodiments described herein. The method 200 may also include one or more additional steps that may be performed by controller or any system embodiments described herein.

It is recognized herein that an optical bandgap of a layer of interest (e.g., a test layer) utilized in an electrical device such as, but not limited to, a transistor or a memory structure, may be indicative of device performance of the fully-fabricated device. For example, the bandgap of an insulating layer may be inversely proportional to a leakage current through the insulating layer in the transistor. Further, electronic devices such as transistors or memory structures may typically include multiple layers of material to provide a desired function. It may thus be desirable to monitor the bandgap or a metrology metric proportional to the bandgap of an insulating layer within a multilayer stack during a fabrication process as a non-invasive and non-destructive diagnostic.

It is further recognized herein that electrical and/or optical properties of layers of electronic devices may exhibit dimension-dependent physical effects such that it may be desirable to provide metrology targets having similar geometries for diagnostic testing.

In one embodiment, the method 200 includes a step 202 of generating a parameterized model of a metrology target including a multilayer grating formed from two or more layers in which the model is parameterized with geometric parameters associated with the multilayer grating and dispersion parameters indicative of a dispersion of a test layer of the two or more layers. A model of step 202 may therefore include a representation of the physical and optical properties of the metrology target. In this regard, the multilayer grating may be a "device-like" metrology target such that the modeled geometric and dispersion parameters of the multilayer grating may correlate to the geometric and dispersion parameters of corresponding device features. Further, parameterization with at least one geometric parameter and at least one dispersion parameter may provide for a variation of the geometric and/or dispersive properties of at least one layer of the multilayer grating in response to variations of fabrication processes (e.g., of a process tool 102, and the like). Further, the inclusion of both geometric parameters and dispersion parameters may facilitate the determination of the dispersion parameters in the presence of dimension-dependent physical effects.

Figure 3A:
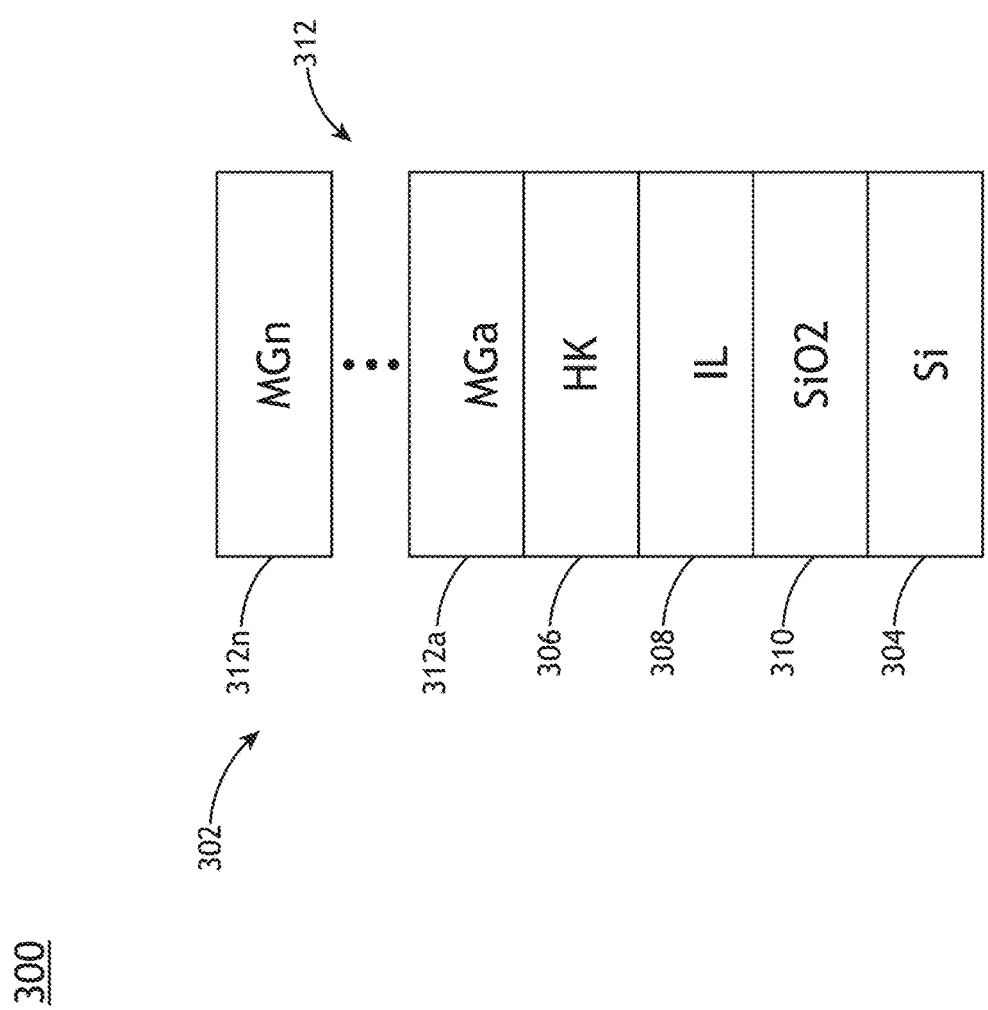
FIG. 3A is a profile view of a multilayer stack of materials suitable for use in a FinFET transistor arrangement, in accordance with one or more embodiments of the present disclosure.

In one embodiment, the multilayer grating includes a fin grating. Accordingly, the multilayer grating may be, but is not limited to being, representative of a FinFET transistor, a memory structure, or the like. FIG. 3A is a profile view 300 of a multilayer stack 302 of materials suitable for use in a multilayer grating arrangement, in accordance with one or more embodiments of the present disclosure. In one embodiment, the multilayer stack 302 includes a substrate layer 304 such as, but not limited to, silicon (Si). In another embodiment, the multilayer stack 302 includes an insulating layer 306, such as, but not limited to, a "high-k" (HK) material layer (e.g., hafnium dioxide (HfO$_2$), hafnium silicate (HfSiO$_4$), nitride hafnium silicate (HfSiON), zirconium silicate (ZrSiO$_4$), and the like). In another embodiment, the multilayer stack 302 includes an interfacial layer 308 (IL), to provide adhesion for the insulating layer 306. For example, the interfacial layer 308 may be, but is not required to be an additional insulating material such as Silicon dioxide (SiO$_2$), and the like. In some embodiments, the multilayer stack 302 includes one or more additional film layers. For example, the multilayer stack 302 may include a fill layer 310 to fill one or more patterned features. A fill layer 310, when present, may be formed from the same or similar materials as the interfacial layer 308 (e.g. formed from silicon dioxide, and the like). In this regard, a fill layer 310 and an interfacial layer 308 may be a common structure such that no physical difference exists between the corresponding designations. In another embodiment, the multilayer stack 302 includes one or more metal gate layers 312 (MG) (e.g. metal gate layers 312a . . . 312n). For example, any number of metal gate layers 312 may be deposited on top of the insulating layer 306. Further, metal gate layers 312 may be formed from any metal or composite material such as, but not limited to titanium nitride (TiN) or Tantalum Nitride (TaN).

Figure 3B:
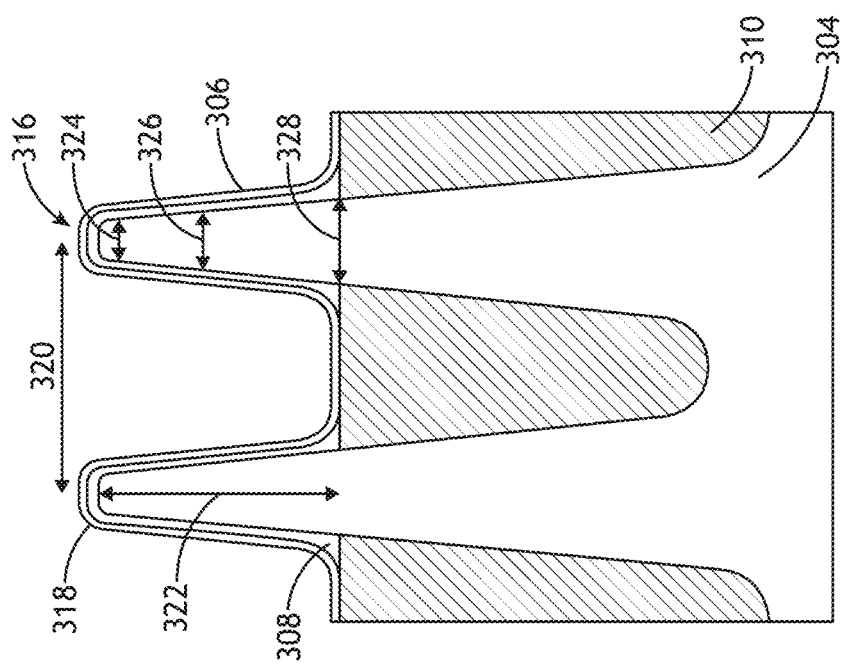
FIG. 3B is a profile view of a multilayer grating formed from a multilayer stack patterned in a 2D fin arrangement, in accordance with one or more embodiments of the present disclosure.
Figure 3C:
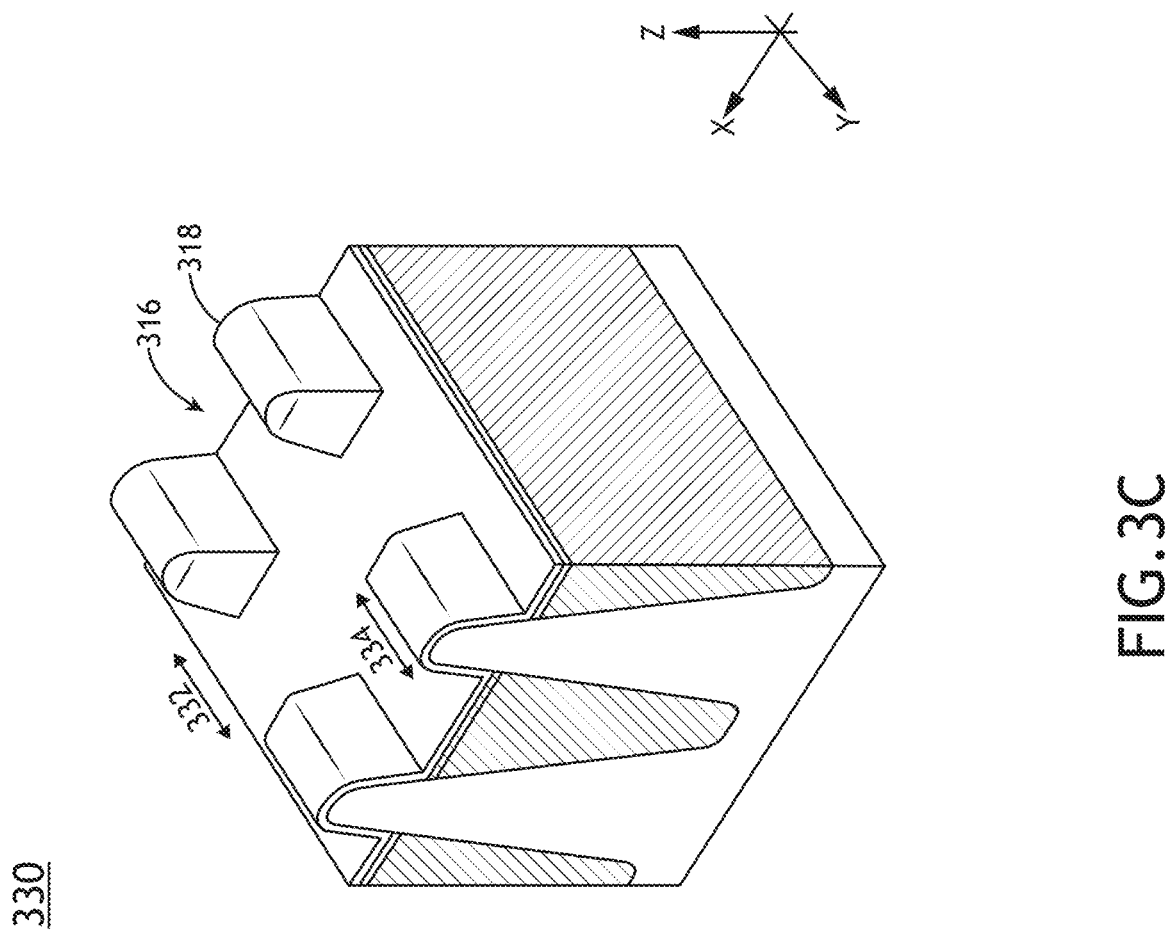
FIG. 3C is a profile view of a multilayer grating formed from a multilayer stack patterned in a 3D fin arrangement, in accordance with one or more embodiments of the present disclosure.

The multilayer stack 302 may be patterned into a 2D or a 3D structure including features (e.g., periodic or aperiodic features) in one or more directions along the surface of the multilayer stack 302. FIG. 3B is a profile view 314 of a multilayer grating 316 formed from a multilayer stack 302 patterned in a 2D fin arrangement, in accordance with one or more embodiments of the present disclosure. In one embodiment, the multilayer grating 316 includes patterned features 318 distributed with a first period 320 in the X direction. Further, the patterned features 318 may be characterized by a height 322 along the Z direction, and one or more critical dimensions defined at selected heights (e.g., a top critical dimension 324 defined as a width at a top of the patterned features 318, a middle critical dimension 326 defined as a width at a mid-level height of the patterned features 318, and a bottom critical dimension 328 defined as a width of the patterned features 318 at a surface of the multilayer grating 316). FIG. 3C is a profile view 330 of a multilayer grating 316 formed from a multilayer stack 302 patterned in a 3D fin arrangement, in accordance with one or more embodiments of the present disclosure. In one embodiment, the patterned features 318 may be distributed with a second period 332 along the Y direction and may be further characterized by critical dimensions along the Y direction (e.g., a lateral critical dimension 334). Referring generally to FIGS. 3B and 3C, geometric characteristics of the multilayer grating 316 such as, but not limited to the size of the patterned features 318 (e.g., the height 322, the middle critical dimension 326, the top critical dimension 324, the lateral critical dimension 334, and the like) or the shape of the of the patterned features 318 (e.g., a difference between the top critical dimension 324 and the bottom critical dimension 328, and the like) may impact the optical characteristics (e.g., dispersion characteristics) of any of the layers including, but not limited to the insulating layer 306 (e.g., a test layer for which the bandgap may be proportional to device performance).

It is to be understood that the specific embodiments of metrology targets described in FIGS. 3A through 3D and the associated descriptions provided above are provided solely for illustrative purposes and should not be interpreted as limiting. A metrology target may have any geometry suitable for representing fabricated device features such that measurements of the metrology target may be representative of corresponding device features. Further, metrology targets may be representative of any type of device feature or electronic component and are not limited to FinFET transistors as described herein through illustrative example. A metrology target may further include any number of material layers in any configuration.

The one or more geometric parameters of the model of step 202 may include any parameter associated with the geometry of the multilayer grating such as, but not limited to, the first period 320, the second period 332, the height 322, the top critical dimension 324, the middle critical dimension 326, the bottom critical dimension 328, a sidewall angle, or thicknesses of any constituent layer (e.g., the insulating layer 306, the interfacial layer 308, the substrate layer 304, or the fill layer 310). Additionally, the use of a geometric engine for process modeling may be, but is not required to be, implemented in the ACUSHAPE software product provided by KLA-TENCOR.

The one or more dispersion parameters of the model of step 202 may include any parameter associated with the optical properties of a layer of the multilayer grating. Further, the one or more dispersion parameters may include at least one parameter related to the bandgap ($E_g$) of at least one layer of the multilayer grating (e.g., a test layer). For example, the dispersion parameters may include, but are not limited to, wavelength-dependent values of a real part of the refractive index (n), an imaginary part of the refractive index (k), a real part of the permittivity ($\epsilon_1$), an imaginary part of the permittivity ($\epsilon_2$), or a measure of the bandgap ($E_g$).

In one embodiment, the one or more dispersion parameters of the model of step 202 include one or more parameters associated with a dispersion model suitable for relating spectroscopic signals from a spectroscopic metrology tool 104 to the dispersion of one or more layers of the multilayer grating. Such parameters may be, but are not required to be directly related to physical parameters (e.g., n, k, $E_g$, and the like). Further, such parameters may, but are not required to, provide a representation of a Kramers-Kronig consistent dielectric function. Dispersion models for determining dispersion parameters of one or more layers using spectroscopic metrology techniques are generally described in U.S. Pat. No. 9,595,481 titled "Dispersion model for band gap tracking" issued on Mar. 14, 2017, U.S. Pat. No. 9,405,290 titled "Model for optical dispersion of high-k dielectrics including defects" issued on Aug. 2, 2016, U.S. Pat. No. 9,664,734 titled "Multi-oscillator, continuous Cody-Lorentz model of optical dispersion" issued on May 30, 2017, all of which are incorporated herein by reference in their entirety. It is recognized herein that dispersion models may, but are not required to, account for defect states in film layers that may impact the optical properties and/or electrical properties of the film layers and thus may impact the performance of a fabricated device.

For example, a dispersion model may include a Cauchy model or a Sellmeier model for representing the wavelength-dependent dispersion of one or more layers with empirical constants.

By way of another example, a dispersion model may include a Bruggeman Effective Model Approximation (BEMA), which may represent the dielectric function of a layer as an effective composition of Kramers-Kronig consistent dielectric functions of constituents of the layer. Using this model, the bandgap of the layer may be indirectly derived from calculated dispersion curves and may require a reference.

By way of another example, a dispersion model may include a Tauc-Lorentz (TL) model, which may parameterize the real and imaginary parts of the dielectric function using Kramers-Kronig consistency. The TL model does not constrain derivatives of the dielectric functions and may thus be suitable for layers including potential defects. Using this model, dispersion parameters may be found by fitting spectroscopic signals from a metrology tool and the bandgap of the layer is a function of the fitted dispersion parameters.

By way of another example, a dispersion model may include a Cody Lorenz Continuous (CLC) model, which is similar to the TL model with additional restrictions on the continuity of derivatives of the dispersion functions.

By way of another example, a dispersion model may include a Harmonic Oscillator (HO) model, which may represent absorption regions as Kramers-Kronig consistent harmonic oscillators such that the dielectric function of a layer is a sum of the oscillators. Similar to the TL model, the HO model may account for defect states in fabricated layers.

By way of another example, a Point to Point (P2P) model may be incorporated into a dispersion model by fitting each wavelength of the incident spectrum to a Gaussian or Lorentzian function to describe sub-band structures. A P2P model may provide accurate modeling of films including defects states. For example, a P2P model may provide accurate modeling of small peaks in a dispersion curve associated with defects. Further, it may be the case that a P2P model may account for a variety of defect states not directly accounted for in other models.

It is to be understood that not all possible properties need to be defined as open parameters in the model of step 202. For example, highly-controlled geometric parameters or dispersion parameters may be provided in the model as fixed values not subject to change within a selected tolerance based on foreseeable variations of fabrication processes.

In another embodiment, the method 200 includes a step 204 of measuring a spectroscopic signal of the metrology target corresponding to the modeled multilayer grating. In this regard, the metrology target including the multilayer grating is uncharacterized with unknown values of the geometric parameters, the dispersion parameters, and/or the bandgap of a test layer of the multilayer grating.

The spectroscopic signal may be any metrology signal provided by a spectroscopic metrology tool suitable for providing data relevant to the geometric and dispersion parameters of the model of step 202. For example, the spectroscopic signals may include, but are not limited to, the spectral power, polarization, and phase shift of light incident on the metrology target as a function of wavelength. In a general sense, the spectroscopy signals may include any combination of signals provided by a spectroscopic metrology tool such as a spectrometer, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

In another embodiment, the method 200 includes a step 206 of determining values of the one or more parameters of the modeled multilayer grating providing a simulated spectroscopic signal corresponding to the measured spectroscopic signal within a selected tolerance. In step 206, the spectroscopic signal for an uncharacterized metrology target generated in step 204 is analyzed to determine values of the geometric and dispersion parameters associated with the model of step 202.

The spectroscopic signal may be analyzed by data fitting and optimization techniques including, but not limited to, libraries, fast-reduced-order models, regression, machine-learning algorithms such as neural networks or support-vector machines (SVM), dimensionality-reduction algorithms (e.g., principal component analysis (PCA), independent component analysis (ICA), local-linear embedding (LLE), and the like), sparse representation of data (e.g., Fourier or wavelet transforms, Kalman filters, and the like), or algorithms to promote matching from same or different tool types. Data analysis may be, but is not required to be, performed by the Signal Response Metrology (SRM) software product provided by KLA-TENCOR. The determination of modeled feature parameters from metrology signals is generally described in U.S. Pat. No. 9,412,673 titled "Multi-model metrology" issued on Aug. 9, 2016, U.S.

Patent Publication No. 2014/0297211 titled "Statistical model-based metrology" published on Oct. 2, 2014, U.S. Patent Publication No. 2015/004611 titled "Differential methods and apparatus for metrology of semiconductor targets" published on Feb. 12, 2015, U.S. Patent Publication No. 2016/0109375 titled "Measurement of Small Box Size Targets" published on Apr. 21, 2016, U.S. Patent Publication No. 2016/0282105 titled "Model-Based Single Parameter Measurement" published on Sep. 29, 2016, and U.S. Patent Application No. 2014/0316730 titled "On-device metrology" published on Oct. 23, 2014, which are all incorporated herein by reference in their entirety. The use of process modeling is generally described in U.S. Patent Publication No. 2014/0172394 titled "Integrated use of model-based metrology and a process model" published on Jun. 19, 2014, which is incorporated herein by reference in its entirety. The use of metrology data from multiple metrology tools is generally described in U.S. Patent Publication No. 2016/0141193 titled "System, method and computer program product for combining raw data from multiple metrology tools" published on May 19, 2016, which is incorporated herein by reference in its entirety.

In another embodiment, raw data generated by a metrology tool (e.g., metrology tool 104) is analyzed by algorithms that do not include modeling, optimization and/or fitting (e.g., phase characterization, and the like). It is noted herein that computational algorithms may be, but are not required to be, tailored for metrology applications through the use of parallelization, distributed computation, load-balancing, multi-service support, design and implementation of computational hardware, or dynamic load optimization (e.g., by controller 106). Further, various implementations of algorithms may be, but are not required to be, performed by the controller 106 (e.g., though firmware, software, or field-programmable gate arrays (FPGAs), and the like), or one or more programmable optical elements associated with the system 100.

In one embodiment, step 206 includes training a statistical model to determine the relationships between particular values of the one or more parameters (e.g., the geometric and dispersion parameters) and particular aspects of the measured spectroscopic signal. For example, a statistical model may include any model suitable for generating statistical relationships between aspects of a measured spectroscopic signal and particular values of geometric and dispersion parameters such that the values of the geometric and dispersion parameters of an uncharacterized metrology target may be predicted using the statistical relationships. For example, the statistical model may include, but is not limited to, a linear model, a non-linear model, a SVM, or a neural network. Further, the input data may be preprocessed and reduced using PCA, kernel PCA, ICA, auto-encoders, signal selection, and the like.

It is recognized herein that a statistical model may provide accurate relationships between measured spectroscopic signals from a spectroscopic metrology tool (e.g., metrology tool 104) and modeled geometric and dispersion parameters of nearly any type of metrology target including, but not limited to, targets for which physical and optical properties are linked by dimension-dependent physical effects and targets for which defect states in fabricated layers may impact the corresponding optical or electrical properties. Further, a statistical model may provide relationships between aspects of the measured spectroscopic signals and physically meaningful dispersion parameters (e.g., n, k, $E_g$, and the like) or abstracted dispersion parameters associated with a dispersion model (e.g., BEMA, TL, CLC, HO, and the like).

The statistical model of step 206 may be trained by generating a design of experiments (DOE) in which spectroscopic signals are generated for a multitude of metrology targets having varied values of the geometric and dispersion parameters within defined ranges (e.g., associated with anticipated process variations). Further, the generated spectroscopic signals associated with each metrology target in the DOE may be analyzed to determine the relationships between aspects of the spectroscopic signals and particular values of the geometric and dispersion parameters. In this regard, the impacts of variations of the geometric and dispersion parameters, in isolation and in combination, on the resulting spectroscopic signals measurable by a metrology tool (e.g., metrology tool 104) may be determined.

For example, the DOE may be generated at least in part by simulating spectroscopy signals associated with metrology targets including multilayer gratings with varied values of the geometric and dispersion parameters associated with the metrology target model of step 202. The optical interaction of an illumination beam (e.g., metrology illumination beam 132 of the metrology tool 104) may, but is not limited to, be modeled using an electro-magnetic (EM) solver. Further, the EM solver may utilize any method known in the art including, but not limited to, rigorous coupled-wave analysis (RCWA), finite element method analysis, method of moments analysis, a surface integral technique, a volume integral technique, or a finite-difference time-domain analysis.

By way of another example, the DOE may be generated at least in part by fabricating metrology targets including multilayer gratings with varied process parameters to generate varied values of the geometric and dispersion parameters associated with the metrology target model of step 202. Reference metrology tools may then be used to determine the particular values of the geometric and dispersion parameters for each metrology target of the DOE. Further, a spectroscopic metrology tool (e.g., metrology tool 104) may generate relevant spectroscopic signals for each metrology target of the DOE. It is recognized herein that generating the DOE using fabricated structures may facilitate the determination of dispersion parameters (e.g., dispersion parameters including or proportional to the bandgap of an insulating layer 306).

In another embodiment, step 206 includes a regression analysis to determine the values of the geometric and dispersion parameters based on a measured spectroscopic signal provided in step 204. For example, step 206 may include simulating spectroscopic signals (e.g., using an EM solver, and the like as described previously herein) in which the geometric and dispersion parameters are floated in the regression. In this regard, the values of the geometric and dispersion parameters may be determined by minimizing the spectral difference between measured and simulated spectra within a selected regression tolerance.

In another embodiment, the method 200 includes a step 208 of calculating a metrology metric for the metrology target indicative of a bandgap of the test layer (e.g., an insulating layer 306) of the fabricated multilayer grating based on the determined values of the one or more parameters. As described previously herein, a metrology metric indicative of the bandgap of insulating layers may provide diagnostic information associated with expected performance of associated device features. In some embodiments, step 206 provides a direct statistical relationship between aspects of measurable spectroscopic signals and the bandgap of an insulating layer. In such cases, the metrology metric of step 208 may include the determined value of the bandgap. In some embodiments, step 206 provides statistical relationships between aspects of measurable spectroscopic signals and other dispersion parameters related to the bandgap (e.g., a dispersion curve, and the like). Accordingly, step 208 may include calculating the bandgap of the test layer based on the values of the dispersion parameters generated in step 206.

It is recognized herein that the dispersion function of many thin dielectric films may include tail regions near an absorption peak that may drastically impact the determination of the bandgap. For example, sub-bandgap defects states in thin films is generally described in "Sub-bandgap defect states in polycrystalline hafnium oxide and their suppression by admixture of silicon," N. V. Nguyen et al, APL 87, 192903 (2005), which is incorporated by reference herein in its entirety.

In one embodiment, a metrology metric proportional to the bandgap of a test layer may be determined by evaluating an integral of a dispersion curve of the test layer over a transitional energy region around an absorption edge in which the dispersion varies exponentially within a selected transition tolerance. For example, the dispersion curve may be, but is not required to be, determined based on values of the dispersion parameters determined in step 206. Further, the selected transition tolerance may define one or more fitting parameter tolerances such that the dispersion within the transitional energy region may be approximated by an exponential function with the selected transition tolerance.

Evaluating an integral of a dispersion curve over a transitional energy region may provide a metrology metric indicative of the bandgap that is insensitive to the non-zero dispersion values outside of the transitional energy region (e.g., associated with layer defects, and the like) and robust in the presence of noise.

Figure 4:
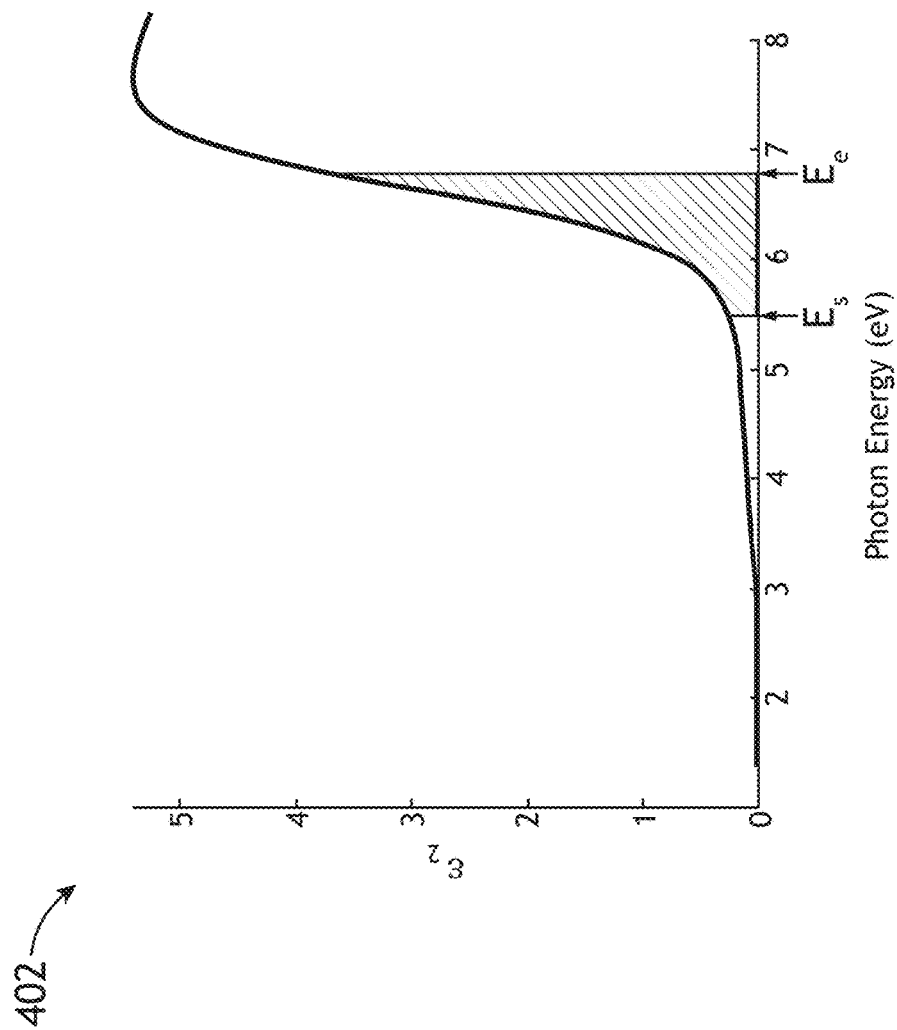
FIG. 4 is a plot of a dispersion curve of the imaginary part of the relative permittivity near the bandgap of a layer in a multilayer grating, in accordance with one or more embodiments of the present disclosure.

FIG. 4 is a plot 402 of a dispersion curve of the imaginary part of the relative permittivity ($\epsilon_2$) near the bandgap of a layer in a multilayer grating, in accordance with one or more embodiments of the present disclosure. In one embodiment, the transitional energy region is defined by bounding photon energies $E_s$ and $E_e$ (or equivalently, wavelengths) such that $\epsilon_2$ varies exponentially in the transitional energy region.

The bounds of the transitional energy region (e.g., $E_s$ and $E_e$ of FIG. 4) may be determined using any method known in the art. For example, the bounds of the transitional energy region may be determined by identifying bounding photon energies that enable the dispersion function near an absorption edge to be fitted by an exponential function within the selected transition tolerance. By way of another example, the bounds of the transitional energy region may be determined by calculating the log of the dispersion function near an absorption edge and identifying bounding photon energies that enable a linear fit within the selected transition tolerance.

In another embodiment, a metrology metric proportional to the bandgap of a test layer may be determined at least in part by reconstructing the dispersion curve (e.g., generated in step 206) with one or more functional forms such as, but not limited to, lines, polynomials, piecewise polynomials, or exponential functions. For example, a metrology metric proportional to the bandgap of a test layer may be determined at least in part by reconstructing the dispersion curve with a generic form of the Urbach tail as an exponential function of photon energy in the transitional energy region. Accordingly, the bandgap may be extracted from the reconstructed dispersion curve using any method such as, but not limited to, evaluating an integral of a dispersion curve of the test layer over the transitional energy region.

In another embodiment, a metrology metric proportional to the bandgap of a test layer may be determined at least in part through a deep-learning model (e.g., a statistical model as described previously herein).

The method 200 may further include predicting the performance of a fabricated device feature based on the metrology metric determined in step 208. For example, a leakage current through the "high-k" insulating layer of a transistor may be predicted based on the metrology metric proportional to the bandgap of the test layer of the metrology target including the multilayer grating. Further, the method 200 may include predicting the performance of a fabricated device feature based on any of the one or more determined parameters (e.g. the geometric and/or the dispersion parameters) determined in step 206. For instance, geometric parameters such as, but not limited to, critical dimensions, sidewall angles, lateral and horizontal dimensions may be utilized in conjunction with the metrology metric determined in step 208 to further predict the eventual performance of a fabricated device feature.

The method 200 may further include controlling one or more process tools (e.g., one or more deposition tools, one or lithography tools, one or more etching tools, and the like) associated with fabricating device features based on the metrology metric determined in step 208. For example, the method 200 may include adjusting a process recipe associated with at least one process tool (e.g. a process tool 102) in response to the metrology metric. Accordingly, variations of the metrology metric (and thus the bandgap of the test layer) on one or more metrology targets of a wafer may be used to modify one or more aspects of subsequent layers on the same wafer (e.g., to compensate for the variations of the test layer) or may be used to modify the deposition of one or more aspects of a fabricated device on a subsequent production run.

Further, the method 200 may include adjusting a process recipe associated with at least one process tool (e.g. a process tool 102) in response to any of the one or more determined parameters (e.g. the geometric and/or the dispersion parameters) determined in step 206. For instance, a process recipe may be adjusted based on geometric parameters such as, but not limited to, critical dimensions, sidewall angles, lateral and horizontal dimensions in conjunction with the metrology metric determined in step 208 to further achieve selected fabrication and performance tolerances.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A bandgap quantification method, comprising:
   generating a model of a metrology target, the metrology target including a multilayer grating including a patterned substrate layer and two or more additional layer, the two or more additional layers forming a multilayer stack shaped to conform to at least a portion of the patterned substrate layer, the two or more additional layers including a test layer to be modeled, wherein at least one of a size or spacing of elements of the multilayer pattern are representative of device features to be fabricated on a common sample with the metrology target, the model parameterized with two or more parameters associated with the multilayer grating, wherein the two or more parameters include one or more geometric parameters indicative of at least a size, shape, or periodicity of the test layer within the elements of the multilayer pattern, wherein the two or more parameters include one or more dispersion parameters indicative of a dispersion of at least a bandgap of the test layer including dimension-dependent physical effects associated with the one or more geometric parameters;
   measuring a spectroscopic signal of a fabricated multilayer grating corresponding to the modeled multilayer grating;
   determining values of the two or more parameters of the modeled multilayer grating providing a simulated spectroscopic signal corresponding to the measured spectroscopic signal within a selected tolerance; and
   calculating a metrology metric for the metrology target indicative of a bandgap of the test layer of the fabricated multilayer grating based on the determined values of the two or more parameters.

2. The bandgap quantification method of claim 1, wherein the metrology metric comprises:
   an integral of a dispersion curve of the test layer over a transition spectral region, wherein the integral is proportional to the bandgap of the test layer, wherein the dispersion curved is defined by the determined values of the one or more dispersion parameters, wherein the transition region comprises:
   a range over which the dispersion curve varies exponentially within a selected transition tolerance.

3. The bandgap quantification method of claim 2, wherein the dispersion curve of the test layer defined by the determined values of the one or more dispersion parameters is reconstructed to include an Urbach tail that varies exponentially within the transition spectral region.

4. The bandgap quantification method of claim 1, wherein the one or more dispersion parameters comprise:
   at least one of an extinction coefficient, an imaginary part of a dielectric function, or the bandgap of the test layer.

5. The bandgap quantification method of claim 1, wherein the one or more geometric parameters comprise:
   a thickness of at least one layer of the multilayer grating.

6. The bandgap quantification method of claim 1, wherein the multilayer grating comprises:
   a grating structure including periodically-distributed elements formed from the two or more layers.

7. The bandgap quantification method of claim 6, wherein the one or more geometric parameters comprise:
   at least one of a height of the periodically-distributed elements, or a width of the periodically-distributed elements at a selected height.

8. The bandgap quantification method of claim 1, wherein the metrology metric is indicative of a leakage current of a transistor device fabricated with a common fabrication process.

9. The bandgap quantification method of claim 8, further comprising:
   predicting a performance of the transistor device based on the metrology metric.

10. The bandgap quantification method of claim 1, further comprising:
    controlling a process tool for fabricating a transistor device based on the metrology metric.

11. The bandgap quantification method of claim 1, wherein determining values of the two or more parameters of the modeled multilayer grating providing a simulated spectroscopic signal corresponding to the measured spectroscopic signal within a selected tolerance comprises:
    determining statistical relationships between particular values of the two or more parameters and particular aspects of the spectroscopic signal of the modeled multilayer grating; and
    determining values of the two or more parameters of the modeled multilayer grating providing a simulated spectroscopic signal corresponding to the measured spectroscopic signal based on the determined statistical relationships.

12. The bandgap quantification method of claim 11, wherein determining statistical relationships between particular values of the two or more parameters and particular aspects of the spectroscopic signal of the modeled multilayer grating comprises:
    simulating the spectroscopic signal of the modeled multilayer grating with a plurality of values of the one or more parameters; and
    determining the statistical relationships between particular values of the two or more parameters and particular aspects of the spectroscopic signal of the modeled multilayer grating based on the simulated spectroscopic signals.

13. The bandgap quantification method of claim 11, wherein determining statistical relationships between particular values of the two or more parameters and particular aspects of the spectroscopic signal of the modeled multilayer grating comprises:
    generating a reference sample including a plurality of instances of the multilayer grating fabricated with a plurality of values of the two more parameters;
    measuring spectroscopic signals of the plurality of instances of the multilayer grating on the reference sample;
    measuring the values of the two or more parameters for the plurality of instances of the multilayer grating on the reference sample with a metrology tool; and
    determining the statistical relationships between particular values of the two or more parameters and particular aspects of the spectroscopic signal of the modeled multilayer grating based on the measured spectroscopic signals.

14. The bandgap quantification method of claim 1, wherein determining values of the two or more parameters of the modeled multilayer grating providing a simulated spectroscopic signal corresponding to the measured spectroscopic signal within a selected tolerance comprises:

calculating the values of the two or more parameters as regression parameters to minimize differences between a simulated spectroscopic signal of the modeled multilayer grating and the measured spectroscopic signal of the fabricated multilayer grating within the selected tolerance.

* * * * *